US008537783B2

(12) United States Patent
Matsumoto (10) Patent No.: US 8,537,783 B2
(45) Date of Patent: Sep. 17, 2013

(54) WIRELESS COMMUNICATION TERMINAL AND COMMUNICATION METHOD

(75) Inventor: Hiroyuki Matsumoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 665 days.

(21) Appl. No.: 12/513,056

(22) PCT Filed: Oct. 26, 2007

(86) PCT No.: PCT/JP2007/070917
§ 371 (c)(1),
(2), (4) Date: Dec. 17, 2009

(87) PCT Pub. No.: WO2008/053805
PCT Pub. Date: May 8, 2008

(65) Prior Publication Data
US 2010/0309885 A1    Dec. 9, 2010

(30) Foreign Application Priority Data

Oct. 30, 2006   (JP) .................................. 2006-294229
Oct. 30, 2006   (JP) .................................. 2006-294261

(51) Int. Cl.
*H04W 4/00*    (2009.01)
(52) U.S. Cl.
USPC ........................................................ 370/332
(58) Field of Classification Search
None
See application file for complete search history.

(56) References Cited

U.S. PATENT DOCUMENTS

| 6,044,249 | A  | * | 3/2000  | Chandra et al.  ................. 455/62 |
| 6,836,666 | B2 |   | 12/2004 | Gopalakrishnan et al. ........................... 455/452.2 |
| 7,043,249 | B2 |   | 5/2006  | Sayeedi ......................... 455/445 |
| 7,319,680 | B2 |   | 1/2008  | Cho ............................... 370/329 |
| 2002/0183064 | A1 | | 12/2002 | Gopalakrishnan et al. ... 455/452 |
| 2003/0069018 | A1 | | 4/2003  | Matta et al. |
| 2004/0233895 | A1 | | 11/2004 | Linares |
| 2004/0248577 | A1 | | 12/2004 | Sayeedi ......................... 455/445 |
| 2004/0252662 | A1 | | 12/2004 | Cho ............................... 370/329 |

(Continued)

FOREIGN PATENT DOCUMENTS

CN    1852586 A    10/2006
EP    1324628 A1   7/2003

(Continued)

OTHER PUBLICATIONS

3GPP, "Core network protocols: Stage 3 (Release 7)" TS24.008, 3GPP, Sep. 2006, V. 7.5.0, pp. 306-320 URL http://www.3gpp.org/ftp/Specs/archive/24_series/24.008/24008-750.zip.

(Continued)

*Primary Examiner* — John Blanton
(74) *Attorney, Agent, or Firm* — DLA Piper LLP (US)

(57) ABSTRACT

Provided is a wireless communication terminal (100) that includes a handoff determination unit (150a) for determining whether or not to perform handoff based on a measuring result of quality of a signal transmitted from a base station (200) and a handoff threshold, a QoS rate readjustment unit (150b) for readjusting a QoS rate for a base station to which handoff is performed when handoff is performed while a QoS is being set, and a handoff threshold setting unit (150c) for setting a handoff threshold which facilitates handoff when a QoS rate is lowered before and after handoff as a result of readjustment by the QoS rate readjustment unit (150b) and for setting a handoff threshold which impedes handoff when the QoS rate is raised.

16 Claims, 9 Drawing Sheets

(56) References Cited

U.S. PATENT DOCUMENTS

| | | |
|---|---|---|
| 2005/0227694 A1 | 10/2005 | Hayashi ............ 455/436 |
| 2005/0286470 A1 | 12/2005 | Asthana et al. |
| 2006/0014539 A1* | 1/2006 | Oh ............... 455/436 |
| 2006/0099950 A1* | 5/2006 | Klein et al. ........ 455/439 |
| 2006/0126589 A1 | 6/2006 | Sayeedi ............ 370/338 |
| 2007/0248028 A1 | 10/2007 | Choe et al. ......... 370/254 |
| 2007/0298825 A1 | 12/2007 | Kayama et al. ...... 455/522 |
| 2008/0039088 A1 | 2/2008 | Fukushima et al. .... 455/436 |
| 2008/0070576 A1* | 3/2008 | Sanders et al. ...... 455/436 |
| 2008/0194263 A1* | 8/2008 | Usuda et al. ........ 455/442 |

FOREIGN PATENT DOCUMENTS

| | | |
|---|---|---|
| EP | 1434458 A1 | 6/2004 |
| JP | 2001078242 A | 3/2001 |
| JP | 2003-046482 | 2/2003 |
| JP | 2004-228678 | 8/2004 |
| JP | 2004297205 A | 10/2004 |
| JP | 2005-006337 | 1/2005 |
| JP | 2005-515707 | 5/2005 |
| JP | 2005-286909 | 10/2005 |
| JP | 2006-080915 | 3/2006 |
| JP | 2006-115410 | 4/2006 |
| JP | 2006-345251 | 12/2006 |
| JP | 2007-288781 | 11/2007 |

OTHER PUBLICATIONS

Japanese language office action dated Jul. 5, 2011 and its English language translation for corresponding Japanese application 2006294229.

Chinese language office action dated Jul. 27, 2011 and its English language translation for corresponding Chinese application 200780040353.2.

Extended European search report dated Jun. 13, 2013 issued in corresponding European application 07830651.1 cites the U.S. patent application publications and foreign patent documents listed above.

* cited by examiner

WIRELESS COMMUNICATION TERMINAL AND COMMUNICATION METHOD

CROSS REFERENCE TO RELATED APPLICATION

This application is a national stage of international application No. PCT/JP2007/070917, filed on Oct. 26, 2007, and claims priority to and the benefit of Japanese Patent Application No. 2006-294229 filed Oct. 30, 2006 and Japanese Patent Application No. 2006-294261 filed on Oct. 30, 2006, the entire content of which is incorporated herein by reference.

TECHNICAL FIELD

The present invention relates to a wireless communication terminal capable of transmitting a QoS (Quality of service) set-up request with a call connection request to a base station, and starting communication with a QoS rate determined in response to the QoS set-up request, and a communication method capable of transmitting a QoS (Quality of service) set-up request with a call connection request from a wireless communication terminal to a base station, and allowing the wireless communication terminal to start communication with a QoS rate determined in response to the QoS set-up request.

BACKGROUND ART

A conventional mobile communication system using CDMA (code division multiple access) method generally employs a plurality of methods to transmit data including moving picture data transmitted and received in application such as IP-TV phone or the like.

For example, the CDMA2000 standard defines three communication systems to transmit data: CDMA2000 1x that employs a circuit switching method; CDMA2000 1x EV-DO Rev.0 that employs a packet switching method and supports data rates (transmission speed) of uplink up to about 153.6 kbps and downlink up to about 2.4 Mbps; and CDMA2000 1x EV-DO Rev.A that is an accelerated Rev.0 system and supports data rates (transmission speed) of uplink up to about 1.8 Mbps and downlink up to about 3.0 Mbps (see "cdma2000 High Rate Packet Data Air Interface 3GPP2 C.S0024 Version 4.0", 3GPP2, October 2002 (Section 8.5.6.1, Section 9.3.1.3.2.3.2) and "cdma2000 High Rate Packet Data Air Interface 3GPP2 C.S0024-A Version 1.0", 3GPP2, March 2004 (Section 14.2.1.3.1.1, Section 14.3.1.3.1.1)). Moreover, CDMA2000 1x EV-DO Rev.A has a feature that a function for controlling QoS (Quality of Service) is added.

Figure 5:
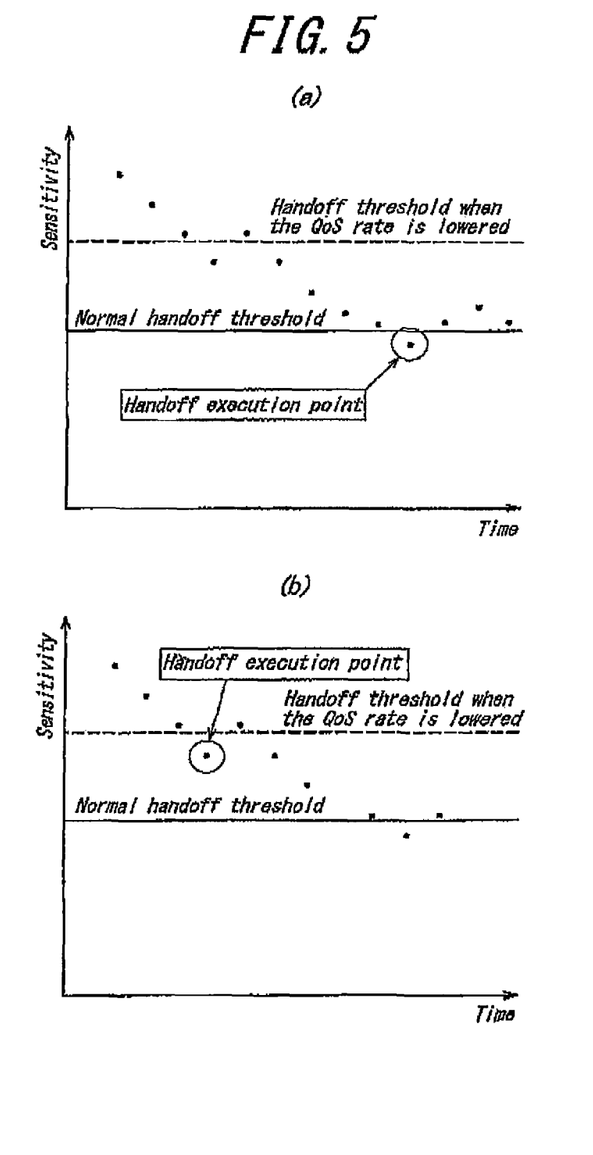

An initial connection in a mobile communication system will be described by referring to a sequence diagram shown in FIG. 5.

When a call connection request (ConnectionRequest) signal is transmitted from a wireless communication terminal to a base station, the base station which received the request signal transmits an AC Ack signal, a TrafficChannelAssignment signal and an RTC Ack signal back to the wireless communication terminal. The wireless communication terminal which received those signals transmits a TrafficChannelComplete signal to the base station. Thus, PPP (Point to Point Protocol) terminal authorization is performed between the wireless communication terminal and the base station. And then, PPP user authorization is performed between the wireless communication terminal and an IP packet terminating device (PDSN), and registration (Regist) is performed between the wireless communication terminal and SIP (Session Initiation Protocol). And then, QoS is established between the wireless communication terminal and the base station, and then RSVP negotiation (Resource reSerVation Protocol (RSVP) Negotiation) is performed. When transmission and reception of an Invite signal is performed between the wireless communication terminal and the communication protocol (SIP), the wireless communication terminal can start communication.

Figure 9:
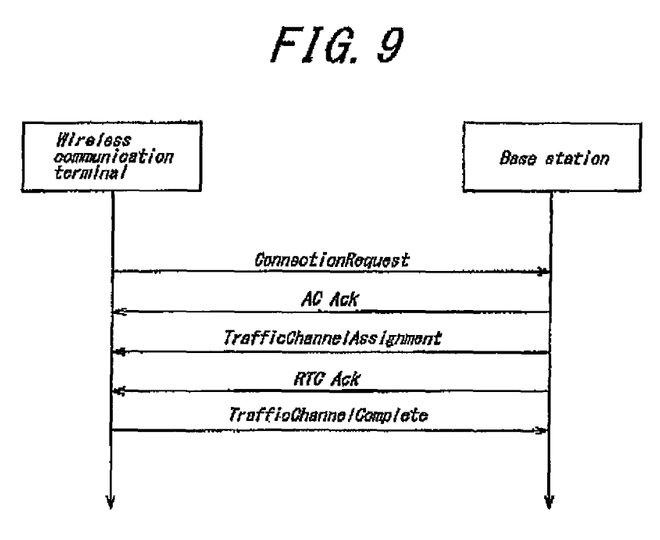
FIG. 9 is a sequence diagram illustrating a connection of a mobile communication terminal from a standby state in a mobile communication system.

A connection (reconnection) of a wireless communication terminal from a standby state in the mobile communication system will be described by referring to a sequence diagram shown in FIG. 9. When a call ConnectionRequest signal is transmitted from the wireless communication terminal to a base station, the base station which received the signal transmits an AC Ack signal, a TrafficChannelAssignment signal and an RTC Ack signal back to the wireless communication terminal. When the wireless communication terminal which received those signals transmits a TrafficChannelComplete signal to the base station, the wireless communication terminal is connected to the base station, and therefore, the wireless communication terminal can start communication.

In a mobile communication system, when performing QoS, a wireless communication terminal basically requests a QoS rate of the maximum speed. However, there are cases that the QoS rate of the maximum speed cannot be acquired by reason that "resources are not sufficient since there is a large amount of connection to the base station" or the like.

In addition, in the mobile communication system, when performing QoS, a wireless communication terminal basically requests a QoS rate of the maximum speed. However, the QoS rate of the maximum speed cannot be acquired even when the wireless communication terminal which is not allocated to the QoS rate of the maximum speed and which connects to the base station transits to a standby state, and thereafter it connects again to the base station. In other words, the QoS rate is determined after the wireless communication terminal connects to a wireless channel, and the wireless communication terminal starts communication with the determined QoS rate. However, when a wireless channel (lower layer) is cut off due to effects of tunnel or the like, it becomes a dormant state, and in the dormant state, the lower layer is released and a high session maintains an active state. And then, when the wireless channel is recovered, the wireless communication terminal re-connects to the wireless channel. However, the QoS rate when reconnection is established is maintained at the same level with the QoS rate at the initial connection.

DISCLOSURE OF THE INVENTION

Problems to be Solved by the Invention

In an existing mobile communication system, since a QoS rate is determined based on only a state when connection is performed and the QoS rate is still maintained after handoff, there are cases that a QoS rate after handoff is not at the optimum level. Specifically, although it is possible to raise a QoS rate when a base station after handoff has more resources than a base station before handoff, the wireless communication terminal cannot acquire a QoS rate of the maximum speed unless releasing the connection once and then establishing new connection.

Moreover, in the existing mobile communication system, when a wireless communication terminal which connects to a base station transits to a dormant state, and thereafter it returns to an active state from the dormant state, although the terminal reconnects to a wireless channel, the QoS rate at reconnection is maintained at the same level with the QoS rate at initial connection. For example, when the QoS rate at the initial connection is not a QoS rate of the maximum speed, the wireless communication terminal cannot acquire the QoS rate of maximum speed at reconnection.

According to the present invention, a QoS rate is readjusted when handoff is performed. Moreover, a handoff threshold is controlled according to states of base stations before and after handoff. Thus, it is a first advantage of the present invention to provide a wireless communication terminal which can acquire a QoS rate as high as possible after handoff.

According to the present invention, a QoS rate is readjusted for a base station when a wireless communication terminal returns from a dormant state. Moreover, a handoff threshold is controlled according to states of the base station before and after return. Thus, it is a second advantage of the present invention to provide a wireless communication terminal which can acquire a QoS rate as high as possible after return. According to the present invention, a QoS rate is readjusted when handoff is performed. A handoff threshold is controlled according to states of base stations before and after handoff. Thus, it is a third advantage of the present invention to provide a communication method which can acquire a QoS rate as high as possible after handoff. According to the present invention, a QoS rate is readjusted for a base station when a wireless communication terminal returns from a dormant state. Moreover, a handoff threshold is controlled according to states of the base station before and after return. Thus, it is a fourth advantage of the present invention to provide a communication method which can acquire a QoS rate as high as possible after return.

SUMMARY OF THE INVENTION

To achieve the first advantage, a wireless communication terminal of the present invention is capable of transmitting a QoS (Quality of Service) set-up request with a call connection request to a base station and starting communication with a QoS rate determined in response to the QoS set-up request, and includes a handoff determination unit for determining whether or not to perform handoff based on a measuring result of quality of a signal transmitted from a base station and a handoff threshold; and a QoS rate readjustment unit for readjusting a QoS rate for a base station to which handoff is performed when handoff is performed while a QoS is being set.

According to an embodiment of the present invention, the wireless communication terminal further includes a handoff threshold setting unit for setting a handoff threshold which facilitates handoff when a QoS rate after handoff is set to be lower than a QoS rate before handoff as a result of readjustment by the QoS rate readjustment unit.

According to another embodiment of the present invention, the wireless communication terminal further includes a handoff threshold setting unit for setting a handoff threshold which impedes handoff when a QoS rate after handoff is set to be higher than a QoS rate before handoff as a result of readjustment by the QoS rate readjustment unit.

According to yet another embodiment of the present invention, the wireless communication terminal allows the QoS rate readjustment unit to readjust the QoS rate when the QoS rate is not a maximum rate.

To achieve the second advantage, a wireless communication terminal according to still another embodiment of the present invention is capable of transmitting a QoS (Quality of Service) set-up request with a call connection request to a base station and starting communication with a QoS rate determined in response to the QoS set-up request, and includes a QoS rate readjustment unit for readjusting a QoS rate for a base station in case of returning to an active state from a dormant state after transiting to the dormant state, while a QoS is being set.

According to still another embodiment of the present invention, the wireless communication terminal further includes a handoff threshold setting unit for setting a handoff threshold which facilitates handoff when a QoS rate after return is set to be lower than a QoS rate before return as a result of readjustment by the QoS rate readjustment unit.

According to still another embodiment of the present invention, the wireless communication terminal further includes a handoff threshold setting unit for setting a handoff threshold which impedes handoff when a QoS rate after return is set to be higher than a QoS rate before return as a result of readjustment by the QoS rate readjustment unit.

According to still another embodiment of the present invention, wireless the handoff threshold setting unit sets the handoff threshold when the QoS rate is not a maximum rate.

To achieve the third advantage, a communication method according to still another embodiment of the present invention is capable of transmitting a QoS (Quality of Service) set-up request with a call connection request from a wireless communication terminal to a base station and allowing the wireless communication terminal to start communication with a QoS rate determined in response to the QoS set-up request, and includes determining whether or not to perform handoff based on a measuring result of quality of a signal transmitted from a base station and a handoff threshold in the wireless communication terminal; and readjusting a QoS rate for a base station to which handoff is performed when handoff is performed while a QoS is being set.

According to still another embodiment of the present invention, the communication method further includes setting a handoff threshold which facilitates handoff when a QoS rate after handoff is set to be lower than a QoS rate before handoff as a result of readjustment of the QoS rate.

According to still another embodiment of the present invention, the communication method further includes setting a handoff threshold which impedes handoff when a QoS rate after handoff is set to be higher than a QoS rate before handoff as a result of readjustment of the QoS rate.

According to still another embodiment of the present invention, the communication method performs readjusting the QoS rate when the QoS rate is not a maximum rate.

To achieve the fourth advantage, a communication method according to still another embodiment of the present invention is capable of transmitting a QoS (Quality of Service) set-up request with a call connection request from a wireless communication terminal to a base station and allowing the wireless communication terminal to start communication with a QoS rate determined in response to the QoS set-up request, and includes readjusting a QoS rate for a base station in case that the wireless communication terminal returns to an active state from a dormant state after transiting to the dormant state, while a QoS is being set.

According to still another embodiment of the present invention, the communication method further includes setting a handoff threshold which facilitates handoff when a QoS rate after return is set to be lower than a QoS rate before return as a result of readjustment of the QoS rate.

According to still another embodiment of the present invention, the communication method further includes setting a handoff threshold which impedes handoff when a QoS rate after return is set to be higher than a QoS rate before return as a result of readjustment of the QoS rate.

According to still another embodiment of the present invention, the communication method performs setting the QoS rate when the QoS rate is not a maximum rate.

Effect of the Invention

According to the present invention, a wireless communication terminal determines whether or not to perform handoff based on a measuring result of quality of a signal transmitted from a base station and a handoff threshold, and readjusts a QoS rate for a base station to which handoff is performed when handoff is performed while a QoS is being set. Thus, it is possible to acquire a QoS rate as high as possible after handoff. Moreover, it is possible to increase the possibility of performing QoS with the maximum rate, and extract resources of the wireless communication terminal as many as possible. Moreover, the convenience of a user is improved in comparison with an to existing mobile communication system.

In addition, according to the present invention, a wireless communication terminal readjusts a QoS rate for a base station when returning to an active state from a dormant state after transiting the dormant state while a QoS is being set. Thus, it is possible to acquire a QoS rate as high as possible after return. Moreover, it is possible to increase the possibility of performing QoS with the maximum rate, and extract resources of the wireless communication terminal as many as possible. Moreover, the convenience of a user is improved in comparison with an existing mobile communication system.

BRIEF DESCRIPTION OF DRAWINGS

FIGS. 4 (a) and (b) are diagrams for explaining operation of adjusting control of a handoff threshold performed in the wireless communication terminal of the present invention;

FIGS. 5 (a) and (b) are diagrams for explaining operation of adjusting control of a handoff threshold performed in the wireless communication terminal of the present invention;

DESCRIPTION OF EMBODIMENTS

Preferred embodiments of the present invention will now be described with reference to the accompanying drawings.

Figure 1:
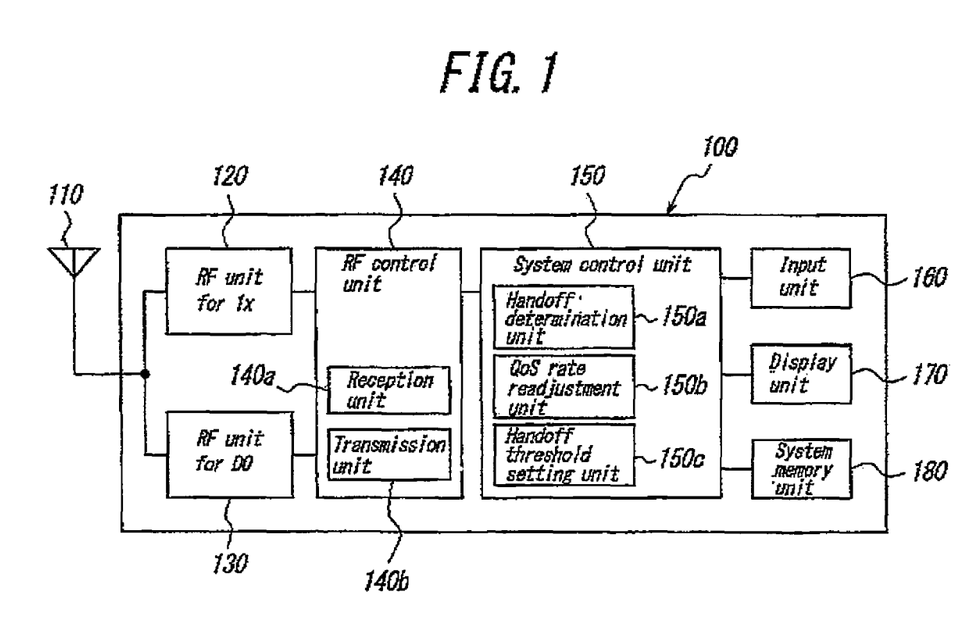
FIG. 1 is a block diagram illustrating a configuration of a wireless communication terminal according to the present invention.

FIG. 1 is a block diagram illustrating a configuration of a wireless communication terminal according to the present invention. The wireless communication terminal (cellular phone) 100 of the present invention uses a common antenna 110, and is designed to switch CDMA2000 1x communication system (hereinafter, it is referred to as "1x system") and CDMA2000 1x EV-DO communication system (hereinafter, it is referred to as "EV-DO system") so as to perform data communication with a base station of each communication system. CDMA2000 1x EV-DO communication system corresponds to not only CDMA2000 1x EV-DO Rev.0 but also CDMA 2000 1x EV-DO Rev.A.

The wireless communication terminal 100 includes an RF unit for 1x 120, an RF unit for DO 130, an RF control unit 140, a system control unit 150, an input unit 160, a display unit 170, a system memory unit 180 and the like as well as the common antenna 110. The RF control unit 140 has a reception unit 140a and a transmission unit 140b. The system control unit 150 has a handoff determination unit 150a, a QoS rate readjustment unit 150b and a handoff threshold setting unit 150c.

The RF unit for 1x 120 converts data or voice signals to be transmitted in the 1x system to high-frequency signals and transmits the converted signals through the common antenna. The RF unit for 1x 120 also converts data or voice signals received through the common antenna 110 to high-frequency signals.

The RF unit for DO 130 converts data to be transmitted in the DO system to high-frequency signals and transmits the converted signals through the common antenna 110. The RF unit for DO 130 also converts data received through the common antenna 110 to high-frequency signals.

The RF control unit 140 controls communication of the 1x system and the DO system, and detects strength of radio waves (RSSI or the like) received through the common antenna from a base station (not shown). The RF control unit 140 functions as the reception unit 140a and the transmission unit 140b based on a high-frequency signal inputted from/outputted to the RF unit for 1x 120 or the RF unit for DO 130.

The system control unit 150 manages and controls every units of the wireless communication terminal 100.

The handoff determination unit 150a determines whether or not to perform handoff based on a measuring result of quality of a signal transmitted from a base station and a handoff threshold.

The QoS rate readjustment unit 150b readjusts a QoS rate for a base station to which handoff is performed when handoff is performed while a QoS is being set. Moreover, the QoS rate readjustment unit 150b readjusts a QoS rate for a base station when the wireless communication terminal 100 returns to an active state from a dormant state after transiting to the dormant state, while a QoS is being set.

The handoff threshold setting unit 150c sets a handoff threshold which facilitates handoff when a QoS rate after handoff is set to be lower than a QoS rate before handoff, and sets a handoff threshold which impedes handoff when the QoS rate after handoff is set to be higher than the QoS rate before handoff. Moreover, the handoff threshold setting unit 150c sets a handoff threshold which facilitates handoff when a QoS rate after return is set to be lower than a QoS rate before return, and sets a handoff threshold which impedes handoff when the QoS rate after return is set to be higher than the QoS rate before return.

The input unit 160 is used when a user inputs information or selects any one of selection items displayed on a display screen of the display unit 170. The input unit 160 has various keys such as ten key, four directional keys, and the like and various buttons such as application button and the like.

The system memory unit 180 has a memory such as RAM or the like, and stores an application program and temporary data. The temporary data includes "handoff thresholds before and after adjustment" which will be described later.

Figure 2:
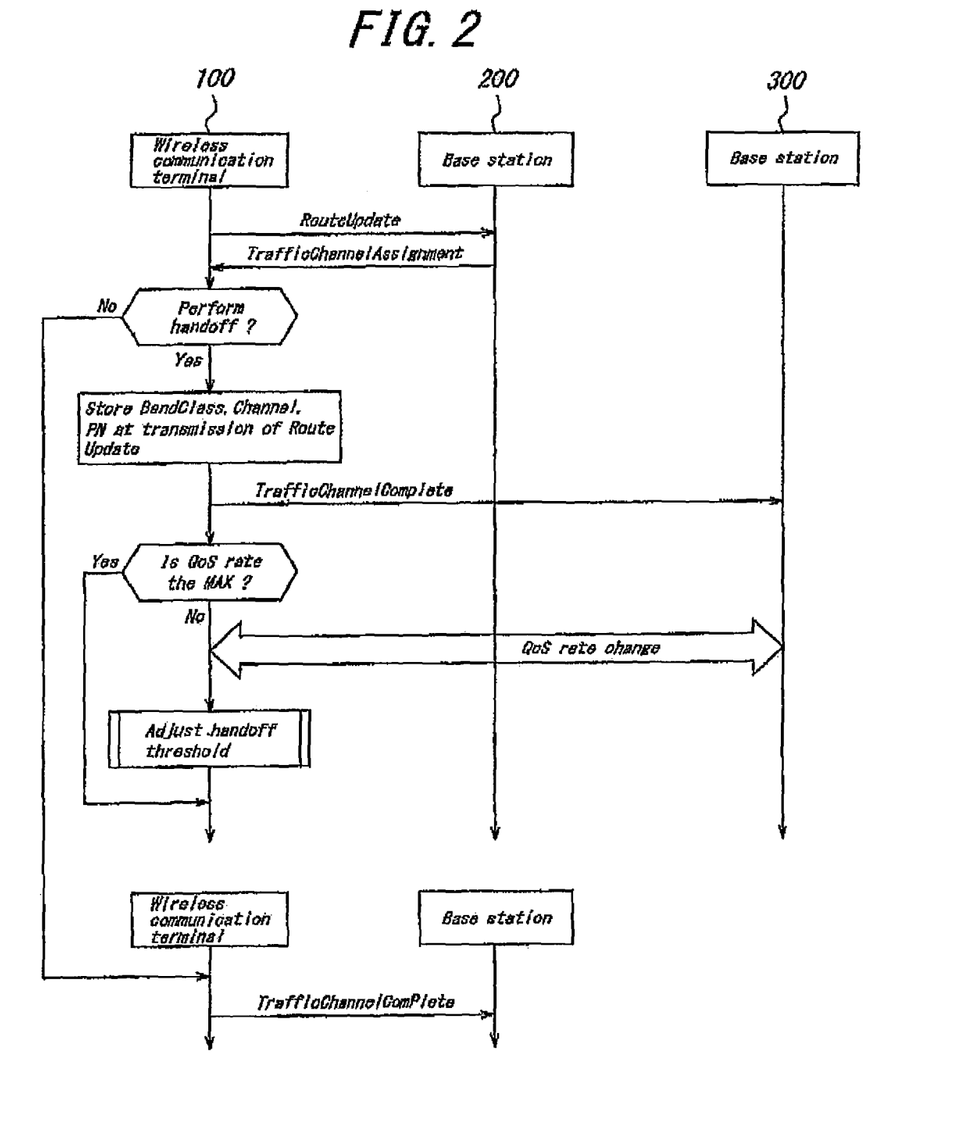
FIG. 2 is a sequence diagram illustrating the first communication method of a mobile communication system including the wireless communication terminal of the present invention.

Now, a first communication method of the mobile communication system including the wireless communication terminal of the present invention will be described by referring to a sequence diagram shown in FIG. 2. FIG. 2 shows an example of a QoS rate change operation when the wireless communication terminal leads handoff. In FIG. 2, the base station 200 is a base station to which the wireless communication terminal 100 is currently connecting, and the base station 300 is a base station to which the wireless communication terminal will connect by performing handoff.

In FIG. 2, when a message "RouteUpdate" for requesting handoff is transmitted from the wireless communication terminal 100 to the base station 200, the base station 200 transmits a TrafficChannelAssignment signal back to the wireless communication terminal 100. When the wireless communication terminal 100 which received the TrafficChannelAssignment signal determines to perform handoff, the wireless communication terminal 100 stores information about BandClass, Channel, speared code (PN) at the time of transmitting the "RouteUpdate" into the system memory unit 180, and transmits a TrafficChannelComplete signal to the base station 300 which is a base station after handoff. In the above description, the determination whether or not to perform handoff is performed based on a measuring result of quality of a signal transmitted from the base station 200 and a handoff threshold stored in the system memory unit 180.

And then, the wireless communication terminal 100 determines "whether the QoS rate is the maximum speed (MAX) or not". The QoS rate change is performed between the base station 300 which received the TrafficChannelComplete signal from the wireless communication terminal 100 and the wireless communication terminal 100 only when it is determined that "the QoS rate is not the maximum speed". When the QoS is changed, the wireless communication terminal 100 performs an "adjusting control of a handoff threshold". When handoff is not performed by the wireless communication terminal 100 which received the TrafficChannelAssignment signal, the wireless communication terminal 100 transmits the TrafficChannelComplete signal to the connected base station 200.

Figure 3:
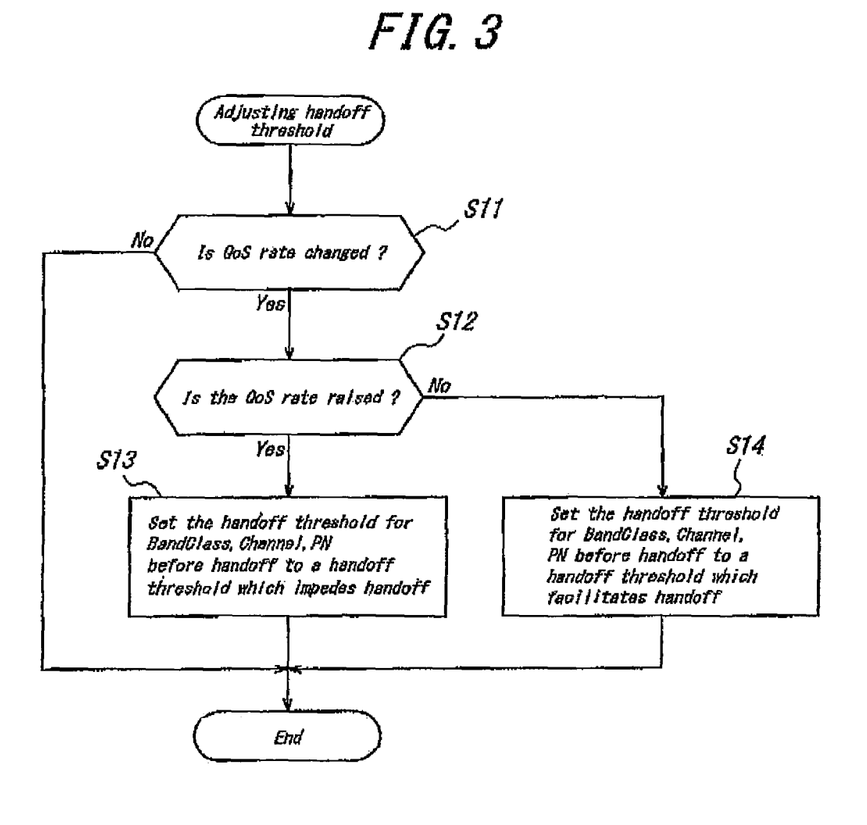
FIG. 3 is a flow chart illustrating the first adjusting control of a handoff threshold performed in the wireless communication terminal of the present invention.

FIG. 3 is a flow chart illustrating a first adjusting control of a handoff threshold performed in the wireless communication terminal of the present invention. First, at step S11 of FIG. 3, it is determined whether the QoS rate is changed by QoS readjustments before and after handoff is performed. When it is determined that the QoS rate is not changed before and after handoff is performed, the process ends since it is a case that an appropriate QoS rate is maintained. On the other hand, when it is determined that the QoS rate is changed before and after handoff is performed, it is determined whether the QoS rate is raised or not, in other words "whether the QoS rate after handoff is set to be higher or lower than the QoS rate before handoff", at step S12.

When a determination result at Step S12 is "Yes", in other words, when the QoS rate after handoff is set to be higher than the QoS rate before handoff, the process proceeds to step S13. When the determination result at Step S12 is "No", in other words, when the QoS rate after handoff is set to be lower than the QoS rate before handoff, the process proceeds to step S14. At step S13, the handoff threshold for BandClass, Channel, PN before handoff is set (changed) to a "handoff threshold which impedes handoff". At step S14, the handoff threshold for BandClass, Channel, PN before handoff is set (changed) to a "handoff threshold which facilitates handoff".

Figure 4:
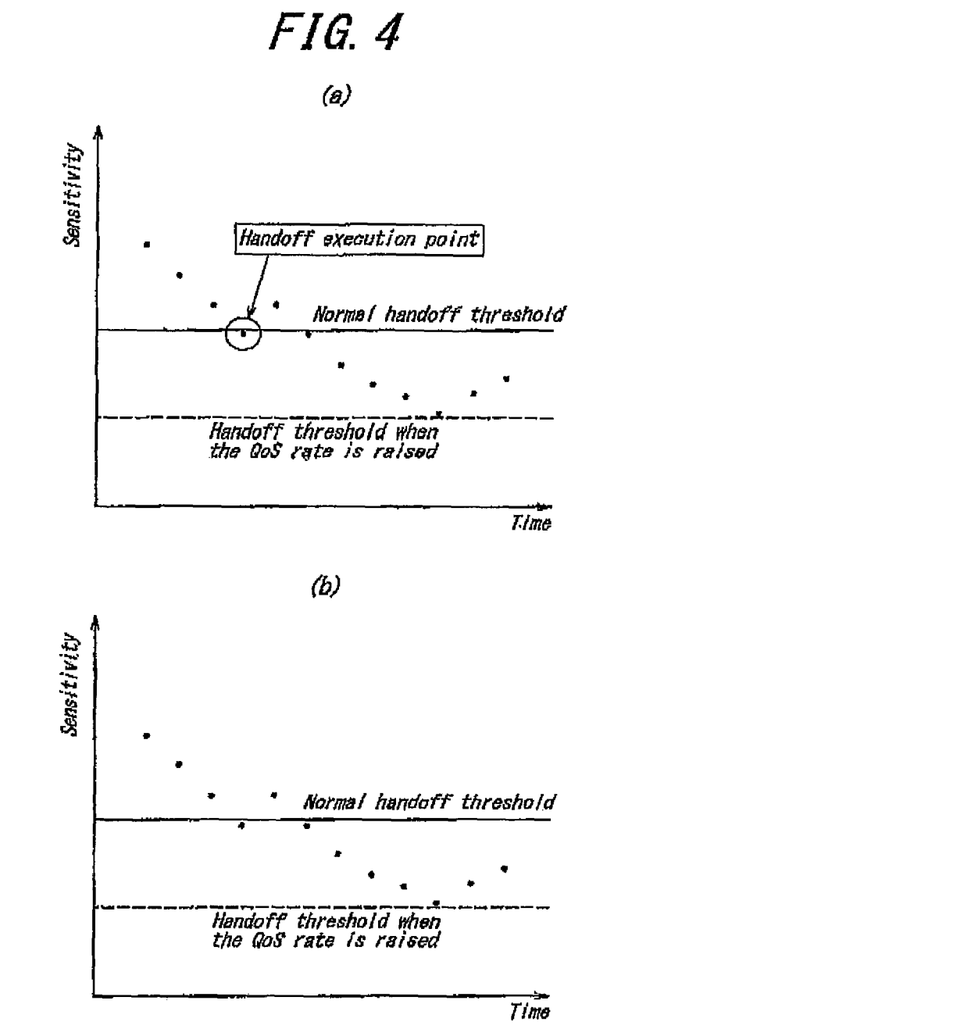

Next, the operation of the first adjusting control of a handoff threshold performed in the wireless communication terminal of the present invention will be described in comparison with the conventional art by referring to FIG. 3, FIG. 4(*a*), (*b*), and FIG. 5(*a*), (*b*).

[When the QoS Rate is Raised Before and after the Handoff]

In the first adjusting control of a handoff threshold shown in FIG. 3, the wireless communication terminal 100 performs the QoS rate change again by executing step S12, which follows "Yes" of step S11, when performing handoff. When the QoS rate is raised before and after handoff is performed, the process proceeds to step S13 since the determination result at step S12 is "Yes", and the handoff threshold for BandClass, Channel, PN before handoff is set to a "handoff threshold which impedes handoff". In case of the conventional art (which does not perform the adjusting control of a handoff threshold of the present invention), since it is determined whether or not to execute handoff using a "normal handoff threshold" indicated by a solid line in FIG. 4(*a*), a point of time where sensitivity of the wireless communication terminal 100 is lowered and crosses the normal handoff threshold line is a "handoff execution point". However, in case of performing the first adjusting control of a handoff threshold according to the present invention, since it is determined whether or not to execute handoff using a "handoff threshold when the QoS rate is raised, which impedes handoff comparing to the normal handoff threshold", a point of time (not shown) where the sensitivity of the wireless communication terminal 100 is lowered and crosses the handoff threshold line when the QoS rate is raised is a "handoff execution point". As the result, handoff to a base station before handoff is not executed until sensitivity of the wireless communication terminal 100 is lowered below normal sensitivity, and it is difficult to return to the base station before handoff (it is possible to stay for long in a cell serviced by a base station which allocates a high QoS rate).

[When the QoS Rate is Lowered Before and after the Handoff]

In the first adjusting control of a handoff threshold shown in FIG. 3, the wireless communication terminal 100 executes step S12, which follows "Yes" of step S11. The wireless communication terminal 100 performs the QoS rate change again when performing handoff. When the QoS rate is lowered before and after handoff is performed, the process proceeds to Step S14 since the determination result at step S12 is "No", and the handoff threshold for BandClass, Channel, PN before handoff is set to a "handoff threshold which facilitates handoff". In case of the conventional art (which does not perform the adjusting control of a handoff threshold of the present invention), since it is determined whether or not to execute handoff using a "normal handoff threshold" indicated by a solid line in FIG. 5(*a*), a point of time where sensitivity of the wireless communication terminal 100 is lowered and crosses the normal handoff threshold line is a "handoff execution point". However, in case of performing the first adjusting control of a handoff threshold according to the present invention, since it is determined whether or not to execute handoff using a "handoff threshold when the QoS rate is lowered, which facilitates handoff comparing to the normal handoff threshold", a point of time where the sensitivity of the wireless communication terminal 100 is lowered and crosses the handoff threshold line when the QoS rate is lowered is a "handoff execution point". As the result, since handoff to a base station before handoff is executed at the point of time where sensitivity of the wireless communication terminal 100 is higher than the normal sensitivity, the wireless communication terminal 100 is easy to return to the base station before handoff (it is easy to leave a base station which allocates a low QoS rate.)

FIG. 2 and FIG. 3 described above show an example that the wireless communication terminal 100 performs the QoS rate change again with performing handoff when "Activeset" which is information indicating a surrounding base station(s), candidate(s) for handoff target, is one and when the wireless communication terminal 100 does not perform QoS with the maximum speed. When the "Activeset" is two or more, the wireless communication terminal 100 may also perform the QoS rate change again with performing handoff similarly to the above way. Moreover, when the number of PNs is increased or decreased, the wireless communication terminal 100 may also perform the QoS rate change again with performing handoff similarly to the above way.

According to the wireless communication terminal of the present invention, the handoff threshold is adjusted according to states of base stations before and after handoff by employing the first adjusting control of a handoff threshold so that it is difficult to return to the base station before handoff when the QoS rate is raised before and after handoff, and it is easy to return to the base station before handoff when the QoS rate is lowered before and after handoff. As the result, the wireless communication terminal can acquire a QoS rate as high as possible after handoff. Moreover, the communication method using the wireless communication terminal can allow the wireless communication terminal to acquire a QoS rate as high as possible after handoff. Therefore, it is possible to increase the possibility of performing QoS with the maximum rate, and extract resources of the wireless communication terminal as many as possible. Moreover, it is possible to improve convenience of a user in comparison with the existing mobile communication system.

Figure 6:
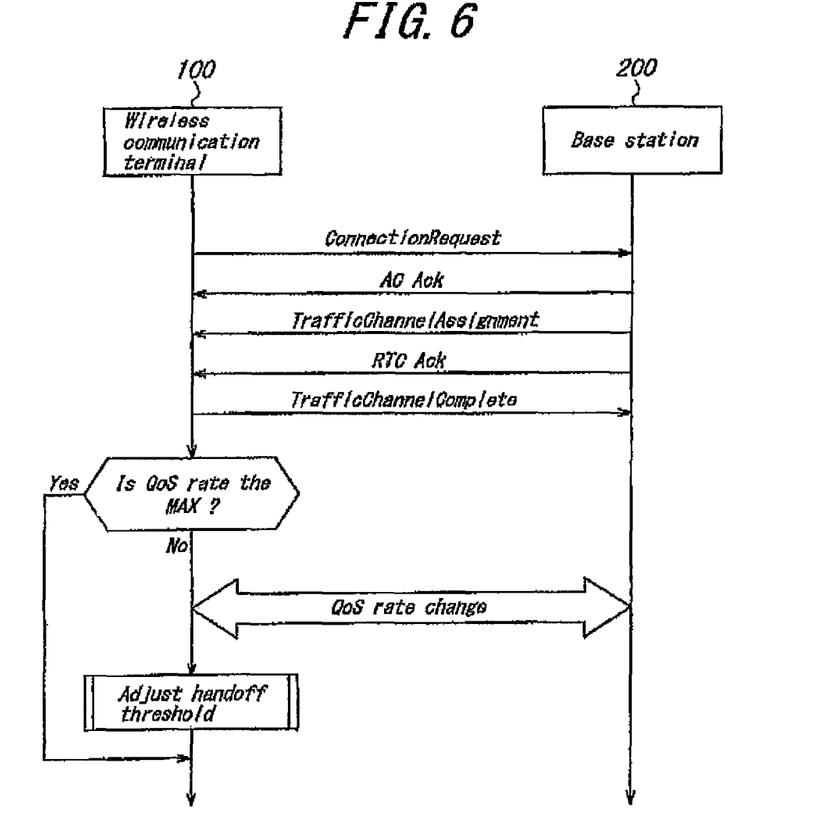
FIG. 6 is a sequence diagram illustrating a second communication method of the mobile communication system including the wireless communication terminal of the present invention.

Next, a second communication method of the mobile communication system including the wireless communication terminal of the present invention will be described by referring to a sequence diagram shown in FIG. 6. FIG. 6 shows an example of a QoS rate change operation leaded by the wireless communication terminal, for example, in case that the wireless communication terminal 100 is connected (reconnected) to the base station 200 when the wireless communication terminal 100 which has connected to the base station 200 returns to an active state from a dormant state after transiting to the dormant state.

In FIG. 6, when a call ConnectionRequest signal is transmitted to the base station 200 from the wireless communication terminal 100 which returns to an active state from a dormant state, the base station 200 which received the signal transmits an AC Ack signal, a TrafficChannelAssignment signal, and an RTC Ack signal back to the wireless communication terminal. The wireless communication terminal 100 which received those signals transmits a TrafficChannelComplete signal to the base station 200. The wireless communication terminal 100 determines "whether a QoS rate is the maximum speed (MAX) or not" with transmitting the TrafficChannelComplete signal. The QoS rate change is performed between the base station 200 which received the TrafficChannelComplete signal and the wireless communication terminal 100 only when it is determined that "the QoS rate is not the maximum speed (MAX)". And, when the QoS rate is changed, an "adjusting control of a handoff threshold" which will be described below is performed.

Figure 7:
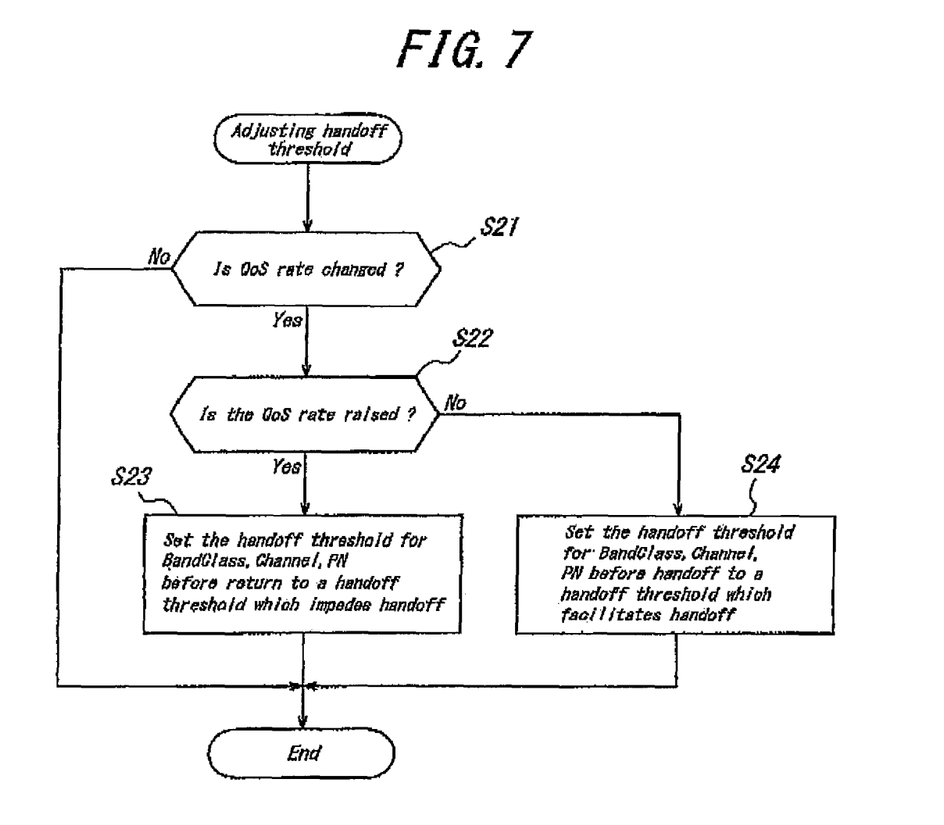
FIG. 7 is a flow chart illustrating the second adjusting control of a handoff threshold performed in the wireless communication terminal of the present invention.
Figure 8:
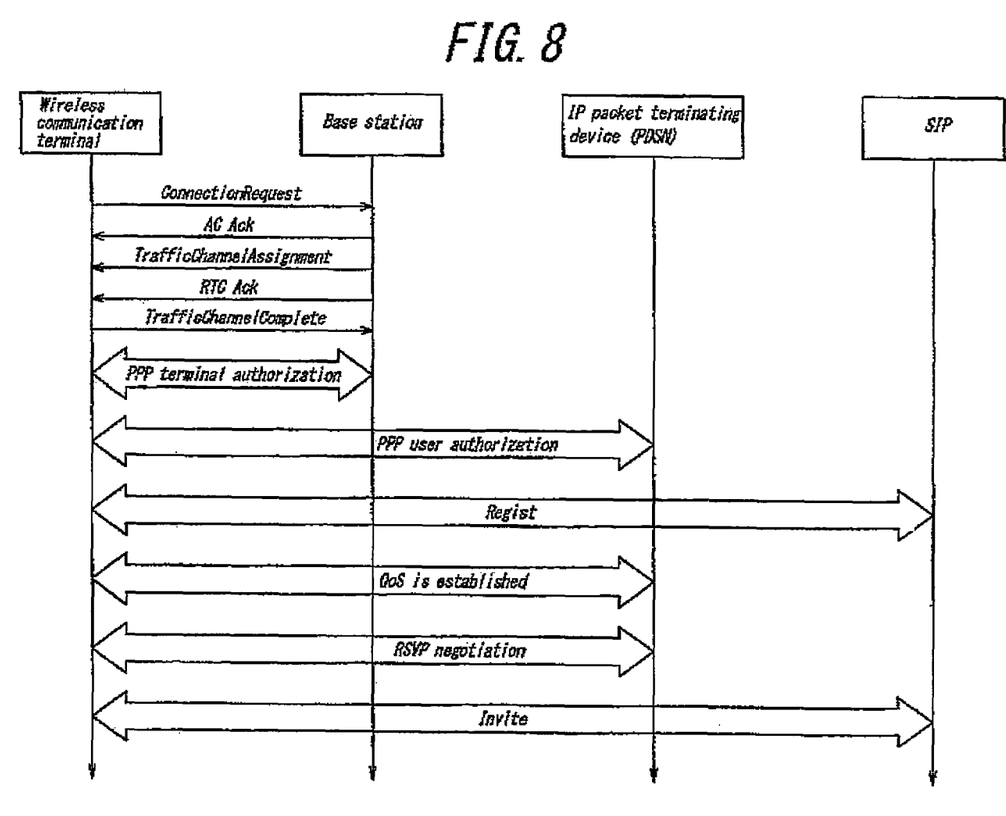
FIG. 8 is a sequence diagram illustrating the initial connection of a mobile communication system.

FIG. 7 is a flow chart illustrating a second adjusting control of a handoff threshold performed in the wireless communication terminal of the present invention. First, at step S21 of FIG. 7, it is determined whether the QoS rate is changed or not by readjustment of the QoS rate before and after return when the wireless communication terminal 100 returns from the dormant state. In here, when it is determined that the QoS rate is not changed before and after return, the process ends since it is a case that an appropriate QoS rate is maintained. On the other hand, when it is determined that the QoS rate is changed before and after return, the process proceeds to the next step S22, and it is determined whether the QoS rate is raised or not, in other words, "whether the QoS rate after return is set to be higher or lower than the QoS rate before return".

When the determination result at step S22 is "Yes", in other words, when the QoS rate after return is set to be higher than the QoS rate before return, the process proceeds step S23. When the determination result at step S22 is "No", in other words, when the QoS rate after return is set to be lower than the QoS rate before return, the process proceeds step S24. At step S23, a handoff threshold for BandClass, Channel and PN before return is set (changed) to a "handoff threshold which impedes handoff". At step S24, the handoff threshold for BandClass, Channel and PN before return is set (changed) to a "handoff threshold which facilitates handoff".

Next, the operation of the second adjusting control of a handoff threshold performed in the wireless communication terminal of the present invention will be described in comparison with the conventional art by referring to FIG. 3, FIG. 4(*a*), (*b*) and FIG. 5(*a*), (*b*).

[When the QoS Rate is Raised Before and after Return to an Active State from a Dormant State]

In the second adjusting control of a handoff threshold shown in FIG. 7, the wireless communication terminal 100 performs the QoS rate changing adjustment by executing step S22, which follows "Yes" of step S21, when it returns to an active state from a dormant state. When the QoS rate is raised before and after return, the process proceeds to Step S23 since the determination result at step S22 is "Yes", and the handoff threshold for BandClass, Channel, PN before return is set to a "handoff threshold which impedes handoff". In case of the conventional art (which does not perform the adjusting control of a handoff threshold of the present invention), since it is determined whether or not to execute handoff using the "normal handoff threshold" indicated by the solid line in FIG. 4(*a*), the point of time where sensitivity of the wireless communication terminal 100 is lowered and crosses the normal handoff threshold line is a "handoff execution point". However, in case of performing the second adjusting control of a handoff threshold according to the present invention, since it is determined whether or not to execute handoff using the "handoff threshold when the QoS rate is raised, which impedes handoff comparing to the normal handoff threshold", the point of time (not shown) where the sensitivity of the wireless communication terminal 100 is lowered and crosses the handoff threshold line when the QoS rate is raised is a "handoff execution point". As the result, handoff to a base station is not executed until sensitivity of the wireless communication terminal 100 is lowered below normal sensitivity, and it is possible to stay for long in a cell serviced by a base station which allocates a high QoS rate.

[When the QoS Rate is Lowered Before and after Return to an Active State from a Dormant State]

In the second adjusting control of a handoff threshold shown in FIG. 7, the wireless communication terminal 100 performs the QoS rate changing adjustment by executing step S22, which follows "Yes" of step S21, when it returns to an active state from a dormant state. When the QoS rate is lowered before and after return, the process proceeds to Step S24 since the determination result at step S22 is "No", and the handoff threshold for BandClass, Channel, PN before return is set to a "handoff threshold which facilitates handoff". In case of the conventional art (Which does not perform the second adjusting control of a handoff threshold of the present invention), since it is determined whether or not to execute handoff using the "normal handoff threshold" indicated by the solid line in FIG. 5(a), the point of time where sensitivity of the wireless communication terminal 100 is lowered and crosses the normal handoff threshold line is a "handoff execution point". However, in case of performing the second adjusting control of a handoff threshold according to the present invention, since it is determined whether or not to execute handoff using the "handoff threshold when the QoS rate is lowered, which facilitates handoff comparing to the normal handoff threshold", the point of time where sensitivity of the wireless communication terminal 100 is lowered and crosses the handoff threshold line when the QoS rate is lowered is a "handoff execution point". As the result, since handoff to a base station is executed at the point of time where the sensitivity of the wireless communication terminal 100 is higher than the normal sensitivity, the wireless communication terminal 100 is easy to leave a base station which allocates a low QoS rate.

FIG. 6 and FIG. 7 described above show an example that the wireless communication terminal 100 performs QoS rate change with returning to an active state from a dormant state when "Activeset" which is information indicating a surrounding base station(s), candidate(s) for handoff target, is one and when the wireless communication terminal 100 does not perform QoS with the maximum speed. When the "Activeset" is two or more, the wireless communication terminal 100 may also perform the QoS rate change with returning to an active state from a dormant state similarly to the above way. Moreover, when the number of received PNs is increased or decreased, the wireless communication terminal 100 may also perform the QoS rate change with returning to an active state from a dormant state similarly to the above way.

According to the wireless communication terminal of the present invention, the handoff threshold is adjusted according to states of a base station before and after return by employing the second adjusting control of a handoff threshold so that the wireless communication terminal 100 can stay for long in a cell serviced by the base station when the QoS rate is raised before and after return to an active state from a dormant state, and perform handoff rapidly to another base station when the QoS rate is lowered before and after return to the active state from the dormant state. As the result, the wireless communication terminal can acquire a QoS rate as high as possible after return. Moreover, the communication method using the wireless communication terminal can allow the wireless communication terminal to acquire a QoS rate as high as possible after return. Therefore, it is possible to increase the possibility of performing QoS with the maximum rate, and extract resources of the wireless communication terminal as many as possible. Moreover, it is possible to improve convenience of user in comparison with an existing mobile communication system.

The invention claimed is:

1. A wireless communication terminal capable of transmitting a QoS (Quality of Service) set-up request with a call connection request to a base station and starting communication with a QoS rate determined in response to the QoS set-up request, comprising:
a handoff determination unit configured to determine whether or not to perform handoff based on a measuring result of quality of a signal transmitted from a base station and a handoff threshold;
a QoS rate readjustment unit configured to readjust a QoS rate for a base station to which handoff is performed, when handoff is performed while a QoS is being set; and
a handoff threshold setting unit configured to set the handoff threshold based on the readjusted QoS rate.

2. The wireless communication terminal according to claim 1, wherein the handoff threshold setting unit is configured to set the handoff threshold which facilitates handoff, when a QoS rate after handoff is set to be lower than a QoS rate before handoff as a result of readjustment by the QoS rate readjustment unit.

3. The wireless communication terminal according to claim 1, wherein the handoff threshold setting unit is configured to set the handoff threshold which impedes handoff, when a QoS rate after handoff is set to be higher than a QoS rate before handoff as a result of readjustment by the QoS rate readjustment unit.

4. The wireless communication terminal according to claim 1, wherein the QoS rate readjustment unit readjusts the QoS rate when the QoS rate is not a maximum rate.

5. A wireless communication terminal capable of transmitting a QoS (Quality of Service) set-up request with a call connection request to a base station and starting communication with a QoS rate determined in response to the QoS set-up request, comprising:
a QoS rate readjustment unit configured to readjust a QoS rate for a base station in case of returning to an active state from a dormant state after transiting to the dormant state while a QoS is being set; and
a handoff threshold setting unit configured to set a handoff threshold based on the readjusted QoS rate.

6. The wireless communication terminal according to claim 5, wherein the handoff threshold setting unit is configured to set the handoff threshold which facilitates handoff, when a QoS rate after return is set to be lower than a QoS rate before return as a result of readjustment by the QoS rate readjustment unit.

7. The wireless communication terminal according to claim 5, wherein the handoff threshold setting unit is configured to set the handoff threshold which impedes handoff, when a QoS rate after return is set to be higher than a QoS rate before return as a result of readjustment by the QoS rate readjustment unit.

8. The wireless communication terminal according to claim 6, wherein the handoff threshold setting unit sets the handoff threshold when the QoS rate is not a maximum rate.

9. A communication method capable of transmitting a QoS (Quality of Service) set-up request with a call connection request from a wireless communication terminal to a base station and allowing the wireless communication terminal to start communication with a QoS rate determined in response to the QoS set-up request, comprising:
determining whether or not to perform handoff based on a measuring result of quality of a signal transmitted from a base station and a handoff threshold in the wireless communication terminal;
readjusting a QoS rate for a base station to which handoff is performed, when handoff is performed while a QoS is being set; and
setting the handoff threshold based on the readjusted QoS rate.

10. The communication method according to claim 9, wherein setting the handoff threshold sets the handoff threshold which facilitates handoff, when a QoS rate after handoff is set to be lower than a QoS rate before handoff as a result of readjustment of the QoS rate.

11. The communication method according to claim 9, wherein setting the handoff threshold sets the handoff threshold which impedes handoff, when a QoS rate after handoff is set to be higher than a QoS rate before handoff as a result of readjustment of the QoS rate.

12. The communication method according to claim 9, wherein readjusting the QoS rate is performed when the QoS rate is not a maximum rate.

13. A communication method capable of transmitting a QoS (Quality of Service) setup request with a call connection request from a wireless communication terminal to a base station and allowing the wireless communication terminal to start communication with a QoS rate determined in response to the QoS set-up request, comprising:

readjusting a QoS rate for a base station in case that the wireless communication terminal returns to an active state from a dormant state after transiting to the dormant state, while a QoS is being set; and setting the handoff threshold based on the readjusted QoS rate.

14. The communication method according to claim 13, wherein setting the handoff threshold sets the handoff threshold which facilitates handoff, when a QoS rate after return is set to be lower than a QoS rate before return as a result of readjustment of the QoS rate.

15. The communication method according to claim 13, wherein setting the handoff threshold sets the handoff threshold which impedes handoff, when a QoS rate after return is set to be higher than a QoS rate before return as a result of readjustment of the QoS rate.

16. The communication method according to claim 14, wherein setting the QoS rate is performed when the QoS rate is not a maximum rate.

\* \* \* \* \*